US008266123B2

(12) United States Patent
Dill et al.

(10) Patent No.: US 8,266,123 B2
(45) Date of Patent: Sep. 11, 2012

(54) PROVIDING PORTAL NAVIGATION FOR ALERTS

(75) Inventors: Marcus Dill, Wiesloch (DE); Stefan Zern, Bruchsal (DE); Roman Hayer, Saarbruecken (DE); Wolfgang Meurer, Neunkirchen (DE); Jens Weidner, Leimen (DE); Markus Kupke, Dielheim (DE); Stefan Busch, Heidelberg (DE); Martin Diewald, Walldorf (DE); Andre Wachholz-Prill, Bellheim (DE)

(73) Assignee: SAP AG, Walldorf (DE)

( * ) Notice: Subject to any disclaimer, the term of this patent is extended or adjusted under 35 U.S.C. 154(b) by 1194 days.

(21) Appl. No.: 10/870,456

(22) Filed: Jun. 18, 2004

(65) Prior Publication Data

US 2005/0283463 A1 Dec. 22, 2005

(51) Int. Cl.
*G06F 7/00* (2006.01)
*G06F 17/00* (2006.01)
(52) U.S. Cl. ........................................................ 707/702
(58) Field of Classification Search .................. 707/702, 707/999.1
See application file for complete search history.

(56) References Cited

U.S. PATENT DOCUMENTS

| | | | | |
|---|---|---|---|---|
| 6,438,580 B1* | 8/2002 | Mears et al. | | 709/204 |
| 6,565,608 B1* | 5/2003 | Fein et al. | | 715/255 |
| 6,574,630 B1 | 6/2003 | Augustine et al. | | |
| 6,617,969 B2 | 9/2003 | Tu et al. | | |
| 6,751,657 B1 | 6/2004 | Zothner | | |
| 6,859,212 B2* | 2/2005 | Kumar et al. | | 715/744 |
| 7,080,066 B1* | 7/2006 | Scheurich et al. | | 707/3 |
| 2002/0005867 A1* | 1/2002 | Gvily | | 345/760 |
| 2002/0138338 A1* | 9/2002 | Trauth et al. | | 705/10 |
| 2002/0154010 A1 | 10/2002 | Tu et al. | | |
| 2003/0120593 A1* | 6/2003 | Bansal et al. | | 705/39 |
| 2003/0226103 A1* | 12/2003 | Hayer et al. | | 715/501.1 |
| 2004/0001103 A1* | 1/2004 | Fliess et al. | | 345/810 |
| 2004/0225718 A1* | 11/2004 | Heinzel et al. | | 709/206 |
| 2005/0228880 A1* | 10/2005 | Champlin | | 709/224 |
| 2005/0234939 A1* | 10/2005 | Arend et al. | | 707/100 |
| 2005/0235206 A1* | 10/2005 | Arend et al. | | 715/705 |
| 2005/0235208 A1* | 10/2005 | Arend et al. | | 715/712 |
| 2005/0235223 A1* | 10/2005 | Arend et al. | | 715/792 |
| 2005/0235224 A1* | 10/2005 | Arend et al. | | 715/792 |
| 2005/0235251 A1* | 10/2005 | Arend et al. | | 717/104 |
| 2005/0283642 A1* | 12/2005 | Dill | | 714/4 |

(Continued)

OTHER PUBLICATIONS

Wahli et al. "Servlet and JSP Programming with IBM WebShpere Studio and VisualAge for Java" IBM Published May 16, 2000 9 pages.*

(Continued)

*Primary Examiner* — Alexey Shmatov
(74) *Attorney, Agent, or Firm* — Fish & Richardson P.C.

(57) ABSTRACT

Navigating from an alert related to a state of a data object to a source of the alert includes displaying alerts in a portal environment. The portal environment has an analytical portal application associated with an analytical data store and a transaction portal application associated with a transaction data store. One of the alerts includes a transaction alert that is associated with a data object in the transaction data and another of the alerts includes an analytical alert that is associated with a data object. An indication of a transaction alert or an analytical alert is received from a user. When the indication is an indication of an analytical alert, navigation occurs to the analytical portal application. When the indication is an indication of the transaction alert, navigation occurs to the transaction portal application.

13 Claims, 8 Drawing Sheets

U.S. PATENT DOCUMENTS

2006/0195816 A1 * 8/2006 Grandcolas et al. .......... 717/101

OTHER PUBLICATIONS

Boyson et al., "The e-supply chain portal: a core business model", © 2003, Elsevier Science Ltd., pp. 175-192, in particular sections 3 and 4.1.*

Office Action from U.S. Appl. No. 10/870,457, dated Jan. 30, 2009, 13 pages.

Office Action issued in U.S. Appl. No. 10/870,457, dated Jul. 21, 2009, 16 pages.

* cited by examiner

PROVIDING PORTAL NAVIGATION FOR ALERTS

TECHNICAL FIELD

This description relates to alerts, and more particularly to providing portal navigation for an alert.

BACKGROUND

Computer systems often are used to manage and process business data. To do so, a business enterprise may use various application programs running on one or more computer systems. Application programs may be used to process business transactions, such as taking and fulfilling customer orders, providing supply chain and inventory management, performing human resource management functions, and performing financial management functions. Data used in business transactions may be referred to as transaction data, transactional data or operational data. Often, transaction processing systems provide real-time access to data, and such systems may be referred to as on-line transaction processing (OLTP) systems.

Application programs also may be used for analyzing data, including analyzing data obtained through transaction processing systems When data used for analysis is produced in a different computer system than the computer system used for analysis or when a large volume of data is used for analysis, the use of an analysis data repository separate from the transaction computer system may be helpful. An analysis data repository may store data obtained from transaction processing systems and used for analytical processing. The analysis data repository may be referred to as a data warehouse, a data mart or an operational data store (ODS).

The term "data mart" typically is used when an analysis data repository stores data for a portion of a business enterprise or stores a subset of data stored in another, larger analysis data repository, which typically is referred to as a data warehouse. For example, a business enterprise may use a sales data mart for sales data and a financial data mart for financial data.

An ODS is designed to enable numerous queries on small amounts of granular data that are updated frequently. An ODS stores detailed data and typically supports tactical, day-to-day decision making. An ODS is important because front line areas of a business may rely on up-to-date, accurate information.

Many application programs, including transaction application programs and analytical application programs that use data warehouses, support alerting mechanisms that inform a user about something to which the user should attend or about which the user should be made aware. For example, an alert may be sent to a sales campaign manager when a deviation between planned and actual figures beyond a predefined threshold occurs. Similarly, an alert may be sent to a sales manager if the manager's pending sales opportunities indicate that the manager may not meet sales targets without action or intervention. Such alerting mechanisms may be particularly important for the user in a data rich environment where it is difficult to find out which information merits immediate attention.

SUMMARY

Generally, the described techniques enable a user to navigate from an alert in a portal environment to a report or portion of a report that generated the alert.

In one general aspect, navigating from an alert related to a state of a data object to a source of the alert includes displaying alerts in a portal environment. The portal environment has an analytical portal application associated with an analytical data store and a transaction portal application associated with a transaction data store. One of the alerts includes a transaction alert that is associated with a data object in the transaction data and another of the alerts includes an analytical alert that is associated with a data object. An indication of a transaction alert or an analytical alert is received from a user. When the indication is an indication of an analytical alert, navigation occurs to the analytical portal application. When the indication is an indication of the transaction alert, navigation occurs to the transaction portal application.

Implementations may include one or more of the following features. For example, navigating to the analytical portal application may include navigating to an analytical data object associated with the analytical portal application. Navigating to the analytical portal application also may include navigating to a particular data object in the analytical data object, where the particular data object has a state that is a basis for generating the analytical alert.

Navigating to the transaction portal application may include navigating to a particular data object associated with the transaction portal application. Navigating to the transaction portal application also may include navigating to a particular data object associated with the transaction portal application, where the particular data object has a state that is a basis for generating the transaction alert.

In another implementation, a first hyperlink is generated to navigate to an analytical data object in the analytical portal application, and a second hyperlink is generated to navigate to a transaction data object in the transaction portal application. The indication of the analytical alert includes the first hyperlink and the indication of the transaction alert includes the second hyperlink. Implementations of the techniques discussed above may include a method or process, a system or apparatus, or computer software on a computer-accessible medium. Other features will be apparent from the description and drawings, and from the claims.

DETAILED DESCRIPTION

Figure 1:
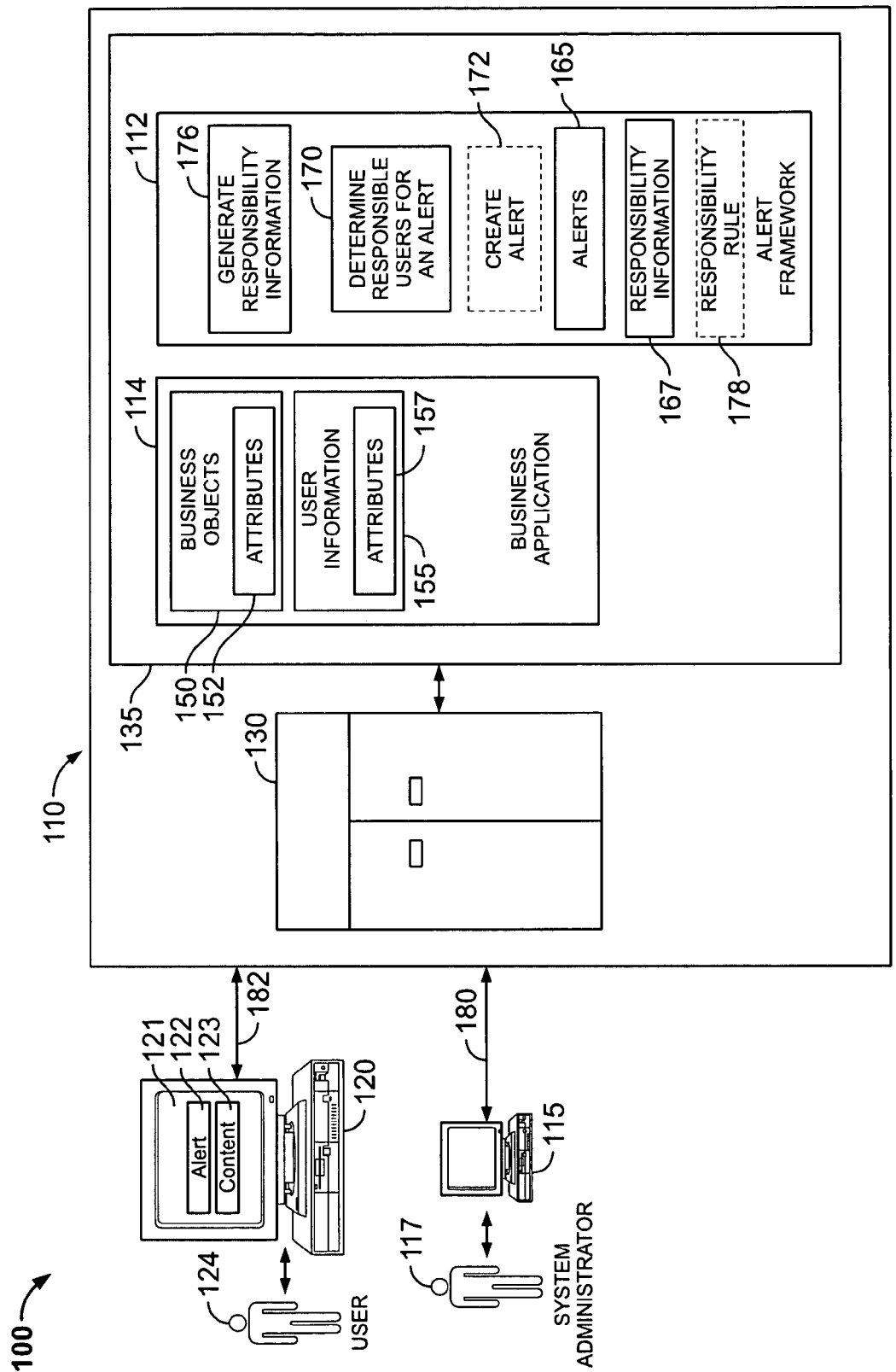
FIGS. 1 and 2 are block diagrams of systems incorporating alert handling techniques.

Navigation inside a portal may occur through various kinds of menus or by hyperlinking from one portal page/application to another. A specific portal application belongs to a specific business object type. For each business object type, there may be a number of different portal applications. When navigating to a new application within the portal, the following information typically is required: (1) the business object type ("object type"); (2) the application name ("method"); and (3) an identifier for the individual object the method should be started with ("object ID").

For example, the user may be working in a portal application that displays an opportunity object 1234. One of the fields of the application contains the account name for which this opportunity is valid. By clicking on the account name, the portal software guides the user to the account master data application and opens that application with the account of interest directly visible. Concurrent portal menu displays are updated to indicate where the user is within the portal. In addition to object type, method, and object ID, the portal provides a context to which that applications can refer in order to allow for transfer of additional information (e.g., additional parameters used by an application).

The mechanism used to identify navigation targets by object type, method, and object ID can be used in order to provide navigation capabilities for alerts generated based on, for example, key performance indicators (KPIs) and reports. An attribute for object type, object ID, and method may be added to an alert. In one implementation, a report may be treated as a new object type. The name of the report may be communicated as the method and the object ID field may contain the object instance for which this report should be started.

In another implementation, reports may be treated as special methods for an object type. For example, a report related to a campaign may be associated with the object type "campaign." In this case, the method is the name of the report, and the object ID is the object instance for which the report should be started.

In an implementation where more than the object instance needs to be communicated to the report, the additional parameters may be transferred via the portal context. In some implementations, the parameters are fixed for each user and are defined within the reports as user-specific variables.

In one implementation, the object type is implicitly available in the data warehouse meta data. For example, the object type may be available as an attribute for an entity or field known to the data warehouse. In another implementation, the object type may be explicitly specified by customizing the settings used to map key figure thresholds to portal alerts. The object ID may be determined from the report based on such customizing. In some implementations, object IDs contained in the report are mapped to unique identifiers. Typically, the method field of an alert is the name of the report. In customizing the portal, the method setting may be overridden and replaced for another method (e.g., a different portal application). The method setting typically is overridden when an operational application is triggered directly from an analytical alert.

When presented with an alert, users do have to find out how to get to the correct place where they can work on the critical issue represented by the alert. Instead, the users are guided to the place where they can act on the problem. The place to which the users are guided can be a report or an operational application.

A single mechanism is used for navigation from an alert to operational and analytical (reports) portal applications. This provides a consistent experience for users, and enables consistent maintenance for an administrator The approach allows the user to make full use of the portal infrastructure, such as, for example, the available context information and full navigation capabilities.

FIG. 1 shows a block diagram of a system 100 of networked computers that includes a computer system 110, such as an alert computer system, that includes an alert framework 112 for a business application 114. The alert framework 112 is used to determine the user who are to receive alerts related to the business application. As shown in FIG. 1, the application framework 112 and the business application 114 may reside on the computer system 110, though this need not necessarily be so. The alert framework 112 may be included in an application that is separate from the business application 114 or may be included as part of the business application 114.

An alert may describe a critical state within a business process that generally requires the immediate attention or reaction of a responsible user. An alert also may correspond to an exception identified during a data analysis process in which an actual state deviates from a desired state. An alert may have a priority level and parameters that, for example, identify an object type and a particular object to which the alert relates. An alert may be grouped into a category or group of alerts and may be associated with an alert identifier that uniquely identifies the alert. A user of the alert framework mechanism may be enabled to set criteria that will generate an alert.

Alerts may be critical or non-critical. Alerts may require immediate attention by the responsible user, or may merely provide general information of a non-critical nature. Exceptions generated by a data analysis process may be used directly in reporting, and also may be used to trigger follow-up activities such as the sending of an email message or other communications. A particular exception may result in the generation of multiple alerts.

The alert may be sent to a user using a variety of communication mechanisms. Examples of such alert mechanisms include electronic mail messages, short message service (SMS) text messages, other methods of sending text messages over a voice or data network to a mobile telephone, and messages displayed or printed during a log-on or sign-on process.

More particularly, the system 100 includes the computer system 110, a client computer 115 used by a system administrator 117 to administer the alert application and/or the business application, and a client computer 120 used by a user 124 to access the alert application and/or the business application. As shown in FIG. 1, the client computer 120 provides a portal 121 that displays both alerts 122 and content 123 to the user 124. Navigation inside the portal 121 may occur through various kinds of menus or by hyperlinking from one portal page/application to another. A specific portal application belongs to a specific business object type. For each business object type, there may be a number of different portal applications. The use of a portal to view business objects of varying types may help to provide a consistent experience for users and enable consistent maintenance for an administrator. For example, a user may need to learn how to operate only one interface (i.e., the interface of the portal) rather than learn how to operate multiple interfaces of different applications. In addition, having a single point of access may be more convenient for a user than a user accessing similar information presented in different application programs. Also, a user may be able to more easily navigate to information presented in the portal (in comparison with navigating to similar information presented in different applications).

The computer system 110, the client computer 115 and the client computer 120 all are capable of executing instructions on data. As is conventional, the computer system 110 includes a server 130 and a data storage device 135 that is associated with the server 130. The data storage device 135 includes data and executable instructions for the alert framework 112 and the business application 114.

Particular portions of data, here referred to as business objects 150, are stored in the computer system 110. The business objects 150 include multiple business objects. Each of business objects 150 is a collection of data attribute values, and typically is associated with a principal entity represented in a computing device or a computing system. Examples of a business object include information about a customer, an employee, a product, a business partner, a product, a sales invoice, and a sales order. A business object may be stored, for example, as a row in a relational database table, an object in an object-oriented database, data in an extensible mark-up language (XML) file, or a record in a data file. Attributes 152 are associated directly or indirectly with each of the business objects 150. In one example, a customer business object may be associated with a series of attributes including a customer number uniquely identifying the customer, a first name, a last name, an electronic mail address, a mailing address, and a telephone number. In another example, a sales order business object may include a customer number of the purchaser, the date on which the sales order was placed, and a list of products and/or services purchased.

The computer system 110 also stores another particular portion of data, here referred to as user information 155. Like the business objects 150, the user information 155 includes multiple user objects. Attributes 157 are associated with a portion of the user information 155. Each portion of user information is a collection of data attribute values associated with a particular user of the business application. Typically, a portion of user information is directly or indirectly associated with particular one(s) of attributes 157. One type of attribute is a user identifier that uniquely identifies a particular user. Another type of attribute associated with the user, for example, may be an organizational unit to which the user is assigned, the sales territory for which the user is responsible, or the name of the user. The user information may be stored as rows in a relational database table, objects in an object-oriented database, data in an extensible mark-up language (XML) file, or records in a data file.

The alert framework 112 stores alerts 165 and responsibility information 167 that identifies users who are responsible for various business objects or types of alerts related to the business application 114. The computer system 110 uses a process 170 to determine, based on the responsibility information 167, a user who is to receive a particular one of the alerts 167. In some implementations, responsibility information 167 may be in the form of an assignment of a business object to a user. In such a case, the process 170 reads the assignment from the responsibility information 167 and determines the recipient or recipients of an alert as being the responsible user or users for an object that is the subject of the alert or the person responsible for the alert type to which the alert belongs.

By storing responsibility information in a data store that is separate from an alert generation process 172, the identification of responsible users may be decoupled (or otherwise separated) from the process of generating an alert to the responsible users. In addition, the data store having the responsible user data may be centralized and accessible by various applications to generate alerts. For example, the same data store could be used to retrieve responsible users when an alert is generated by a reporting mechanism for an operational process in a transaction system and when an alert is generated by an analytical process in a data warehouse.

The computer system 110 includes a process 176 for generating responsibility information 167 that is separate from the alert generation process 172. The process 176 for generating responsibility information may be executed during design time or configuration time to populate the responsibility information 167 for later use (which typically may be during runtime) when a responsible user for a particular alert is to be determined. Additionally or alternatively, the process 176 for generating responsibility information may be executed at runtime in response to a change in the business objects 150 or the user information 155 that may result in a change in the responsibility information, or even in response to the generation of a particular alert 165.

The computer system 110 and the client computers 115 and 120 may be arranged to operate within or in concert with one or more other systems, such as, for example, one or more LANs ("Local Area Networks") and/or one or more WANs ("Wide Area Networks"). Each of the client computers 115 or 120 may be a general-purpose computer that is capable of operating as a client of the application program (e.g., a desktop personal computer, a workstation, or a laptop computer running an application program), or a more special-purpose computer (e.g., a device specifically programmed to operate as a client of a particular application program). The client computers 115 and 120 use, respectively wired or wireless communication pathways 180 and 182 to communicate with the computer system 110.

For brevity, FIG. 1 illustrates only a single system administrator computer 115 and a single user computer 120 for system 100. However, actual implementations may include multiple system administrator and user computers.

In some implementations, the system administrator 117 optionally defines one or more responsibility rules 178 to identify a process by which the identity of a user who is to receive an alert is to be determined. In some implementations, the system administrator may enter responsibility information as part of using process 172 to create alerts. In other implementations, the system administrator may enter a responsibility rule 178 that identifies a responsible user for a particular object type or a particular object. Alternatively or additionally, the system administrator may identity a computer program or other type of executable functionality to be used by the process 176 to generate responsibility information.

Figure 2:
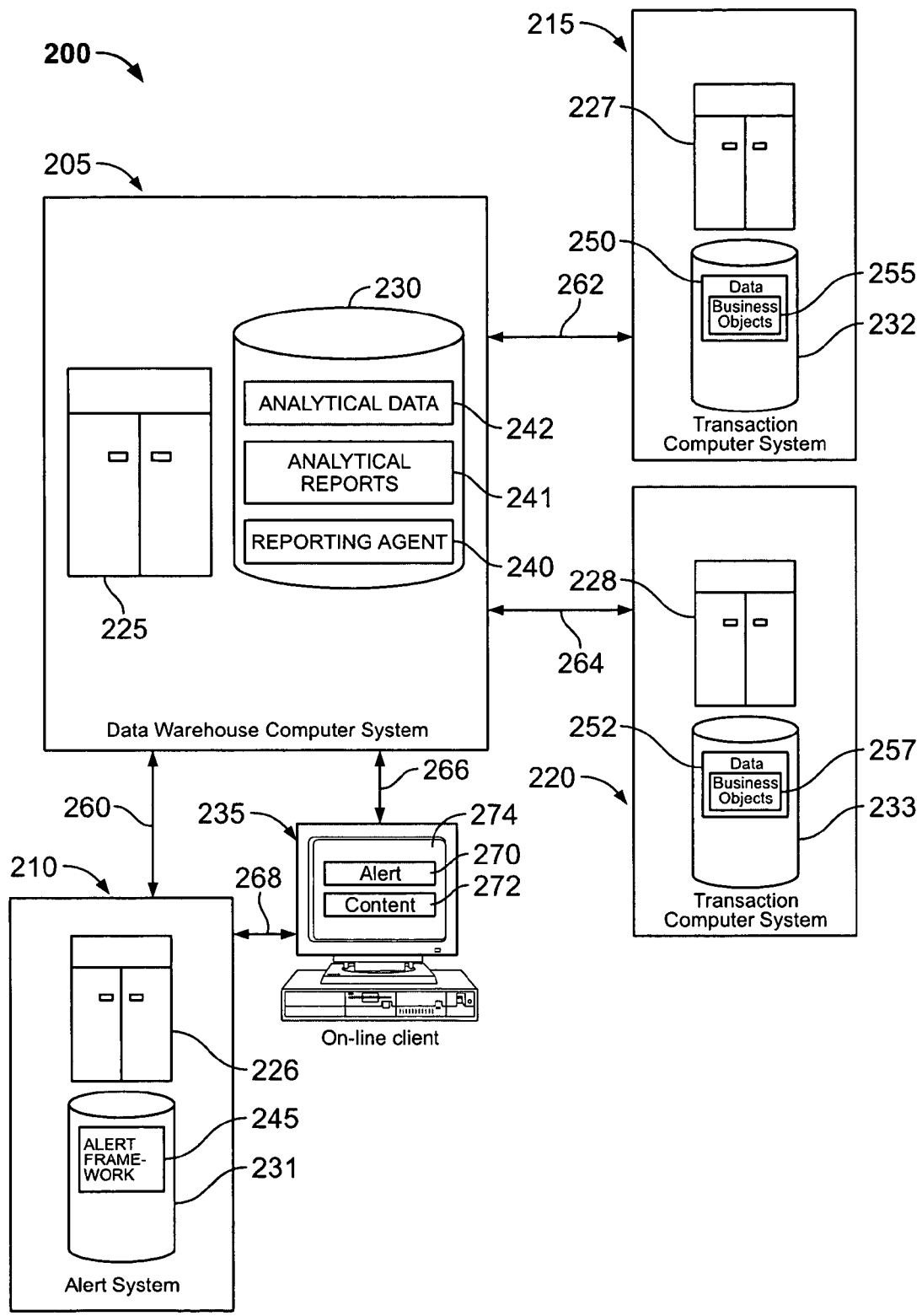

FIG. 2 shows a block diagram of a system 200 of networked computers, including a computer system 205 for a data warehouse, a computer system 210 for an alert system, and transaction computer systems 215 and 220. As is conventional, each of computer systems 205, 210, 215 and 220 includes a respective server 225, 226, 227, or 228 and an associated data storage device 230, 231, 232, or 233. The system 200 also includes a client computer 235 that is used to administer the data warehouse and the alert system.

The data warehouse supported by the computer system 205 includes a reporting agent 240 that allows the scheduling and generation of analytical reports 241 based on analytical data 242. The reports can be scheduled in a batch process so that report results can be checked against pre-specified threshold values. Reaching or missing a threshold value triggers a particular alert.

The alert system supported by the computer system 210 corresponds generally to the computer system 110 described with respect to FIG. 1. The system includes an alert framework 245 that allows an alert to be defined, distributed, and received across different systems that support display of the alert within a portal. The alert may be transported by e-mail or through other messaging formats or communication channels. In providing alert messages to responsible users from a variety of applications, some implementations may use the responsibility information (not shown) in the alert framework 212 to determine a responsible entity for each object type for which an alert may be created. The information may be used to send an alert for the object to the appropriate responsible user.

The data storage devices 232 and 233 of computer systems 215 and 220 store respective data 250 and 252, including business objects 255 and 257. Each of business objects 252 or 257 includes multiple business objects, each of which is a collection of data attribute values, and typically is associated with a principal entity represented in a computing device or a computing system.

The storage device 230 of the data warehouse computer system 205 stores a particular portion of data that is referred to below as a data warehouse 230. The data warehouse 230 is a central repository of data that may have been extracted from the business objects 255 or 257 of transaction computer systems 215 and 220. The data in the data warehouse 230 is used for special analyses, such as data mining analyses used to identify relationships among data. The results of the data mining analyses are stored in the data warehouse 230.

The data warehouse computer system 205 is capable of delivering and exchanging data with the alert system 210 and the transaction computer systems 215 and 220 through respective wired or wireless communication pathways 260, 262 and 264. The data warehouse computer system 205 also is able to communicate with the on-line client 235 that is connected to the computer system 205 through a communication pathway 266 and to the alert system 110 through a communication pathway 268.

The data warehouse computer system 205, the alert system 210, the transaction computer systems 215 and 220, and the on-line client 235 may be arranged to operate within or in concert with one or more other systems, such as, for example, one or more LANs and/or one or more WANs. The on-line client 235 may be a general-purpose computer that is capable of operating as a client of the application program (e.g., a desktop personal computer, a workstation, or a laptop computer running an application program), or a more special-purpose computer (e.g., a device specifically programmed to operate as a client of a particular application program).

As shown, on-line client 235 operates as a client to a portal program and includes a display area 270 for alerts and a display area 272 for content within the portal user interface (UI) 274. The on-line client 235 displays a list of alerts generated from different applications, such as the data warehouse operating on the data warehouse computer system 205 and applications running on transaction computer systems 215 and 220. For example, a user may view alerts relating to analytical information from the data warehouse, alerts relating to a customer relationship management (CRM) system running on transaction computer system 215, and alerts relating to a financial management system running on transaction computer system 220.

In a more particular example, a report in the data warehouse may be created and an alert generated for display in the portal 274 of the on-line client 215. The alert may indicate, for example, that the planned and actual values for a particular campaign deviate by a predetermined amount. The alert includes a hyperlink to go to the particular target application and the hyperlink is properly parameterized (that is, includes the parameters) necessary to go to a particular portion of the report that is related to the alert, as described more fully later.

A user of the on-line client 215 is able to navigate from the list of alerts displayed in the portal to an appropriate portal application. More particularly, navigation inside the portal 274 may occur through various kinds of menus or by hyper-linking from one portal page/application to another. A specific portal application belongs to a specific business object type. For each business object type, there may be a number of different portal applications. When navigating to a new application within the portal, the following information typically is required: (1) the business object type ("object type"); (2) the application name ("method"); and (3) an identifier for the individual object the method should be started with ("object ID").

For example, the user may be working in a portal application that displays an opportunity object 1234. One of the fields of the application contains the account name for which this opportunity is valid. By clicking on the account name, the portal software guides the user to the account master data application and opens that application with the account of interest directly visible. Concurrent portal menu displays are updated to indicate where the user is within the portal. In addition to object type, method, and object ID, the portal provides a context to which that applications can refer in order to allow for transfer of additional information (e.g., additional parameters used by an application).

The mechanism used to identify navigation targets by object type, method, and object ID can be used in order to provide navigation capabilities for alerts generated based on, for example, key performance indicators (KPIs) and reports. An attribute for object type, object ID, and method may be added to an alert. In one implementation, a report may be treated as a new object type. The name of the report may be communicated as the method and the object ID field may contain the object instance for which this report should be started.

In another implementation, reports may be treated as special methods for an object type. For example, a report related to a campaign may be associated with the object type "campaign." In this case, the method field is the name of the report, and the object ID field is the object instance for which the report should be started.

In an implementation where more than the object instance needs to be communicated to the report, the additional parameters may be transferred via the portal context. In some implementations, the parameters are fixed for each user and are defined within the reports as user-specific variables.

In one implementation, the object type is implicitly available in the data warehouse meta data. For example, the object type may be available as an attribute for an entity or field known to the data warehouse. In another implementation, the object type may be explicitly specified by customizing the settings used to map key figure thresholds to portal alerts. The object ID may be determined from the report based on such customizing. In some implementations, object IDs contained in the report are mapped to unique identifiers. Typically, the method field of an alert is the name of the report. In customizing the portal, the method setting may be overridden and replaced for another method (e.g., a different portal application). The method setting typically is overridden when an operational application is triggered directly from an analytical alert.

When presented with an alert, users do have to find out how to get to the correct place where they can work on the critical issue represented by the alert. Instead, the users are guided to the place where they can act on the problem. The place to which the users are guided can be a report or an operational application.

In another example, the user is able to navigate from an alert indicating a potential problem with the user's sales targets. In one example, a sales manager may receive an alert indicating a potential problem with meeting the manager's sales target of actual sales and revenue collected. To understand the situation, the sales manager may need access to unaggregated sales order data generated in the CRM system 215, aggregated sales order data generated in the data warehouse computer system 205, and revenue data generated in the financial management system 220. The user is able to navigate from the alert to the place where the user can more fully understand the problem and take appropriate action.

A single mechanism is used for navigation from an alert to operational and analytical (reports) portal applications. This provides a consistent experience for users, and enables consistent maintenance for an administrator.

The approach allows the user to make full use of the portal infrastructure, such as, for example, the available context information and full navigation capabilities.

In some implementations, the on-line client 235 may be configured to perform the administration function of computer system 115 of FIG. 1. Alternatively or additionally, the system 200 may include a computer system 115 of FIG. 1.

The computer system 120 of FIG. 1 may be configured similarly to on-line client 235. For brevity, FIG. 2 illustrates only a single on-line client 235 for system 200. However, actual implementations may include multiple on-line clients and other types of computing devices, such as mobile clients (such as laptop computers) on which users are able to access an application even when the mobile client is not connected with another computer system.

Although FIG. 2 shows the alert system 210 as separate from the data warehouse computer system 205 and the transaction computer systems 215 and 220, the alert system may be included on one of the computer systems 205, 215 or 220. In some implementations, for example, it may be beneficial for the alert mechanism to reside with, or to be an aspect of, the data warehouse application. For example, a data warehouse may provide data storage of master and transactional data, and also provide a large set of transformation tools that allow multiple operations such as joining or splitting data records, converting between implicit hierarchies and explicit hierarchies, look-ups, and value mappings. A data warehouse, such as SAP BW available from SAP AG of Walldorf (Baden), Germany, may provide flexible transformation mechanisms for complicated analytical processes that may be useful in generating responsibility information that is used to determine a responsible user to receive an alert.

Figure 3:
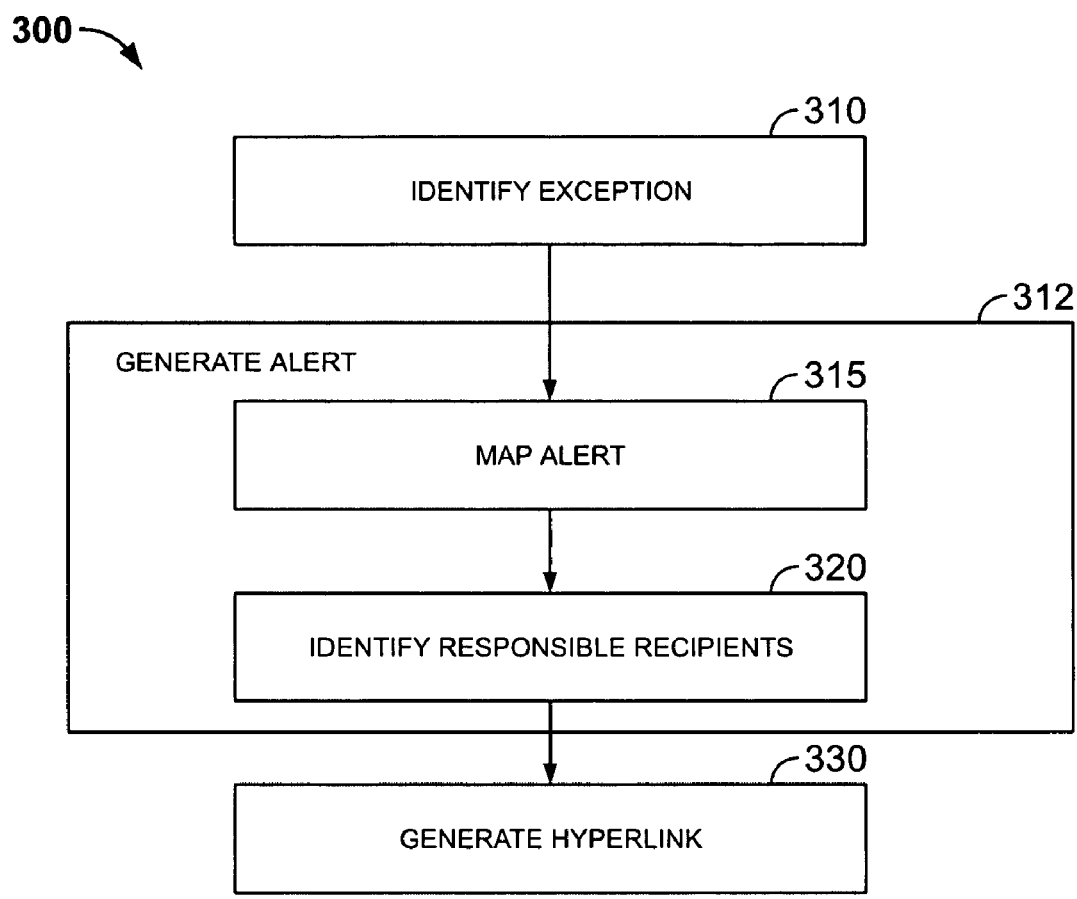
FIGS. 3, 4A, and 4B are flow charts of processes that may be implemented by systems of FIGS. 1 and 2.

FIG. 3 illustrates an exemplary procedure 300 for processing an alert to identify a responsible recipient for the alert. The procedure 300 may be performed by one or more processors on one or more computer systems such as, for example, the computer system 100 of FIG. 1 or the computer system 200 of FIG. 2. A processor is directed by a method, script, or other type of computer program that includes executable instructions for performing the procedure 300. Examples of such a collection of executable instructions include the generate alert process 172 of FIG. 1 and the reporting agent 240 of FIG. 2. The procedure 300 may begin at a predetermined time and date, such as a recurring predetermined time and date. In another implementation, the procedure 300 may begin when a predetermined condition is met, such as the definition of a new alert rule. In another implementation, the procedure 300 may be manually initiated by a system administrator or another type of user.

Initially, the processor identifies an exception (step 310). The exception may be identified from an analysis of a data warehouse, a data mart, or an ODS.

An alert is generated (step 312). Generating the alert may include mapping the exception to an alert (step 315) and accessing responsibility information to identify recipients (i.e., "responsible" users) to receive the alert (step 320). This may be accomplished, for example, where entries of responsibility information include associations between a particular type of alert and users who are to receive the particular type of alert. In some implementations, the appropriate recipient of a particular alert depends on the object type (e.g., sales order object, a sales campaign object, or sales organization object) and/or on the particular object (e.g., a particular sales order, a particular sales campaign, a particular sales organization). In some cases, the type of object may be represented by an object class, whereas the particular object is represented by an instance of the object class. In such a case, the responsibility information identifies the user to whom an alert that relates to a particular object and/or an object type should be sent.

A hyperlink is then generated in order to assist the recipient in navigating to the source of the alert (step 330). The hyperlink may be generated in various ways. In one implementation, a customized table is used to map an object type and method to the target application. The table may be filled out by the user, and may include an object type column (e.g., a report object type), a method associated with the object type, and a target application (e.g., the iView application). A hyperlink is generated to access the target application based on the associated object type and method. The hyperlink is parameterized for a particular alert with an object identifier (e.g., a particular report). The process uses the customized table to generate and parameterize an appropriate hyperlink that, when activated, will cause a user to jump to an appropriate point in a report related to the alert.

In another implementation, the hyperlink may be created based on a different table that maps a report identifier with a particular target application. The report has access to metadata for the report that includes the report's own report identifier and that can be used to look-up the appropriate target application in the table. A hyperlink with appropriate parameterization is then created.

In one example, a sales manager may wish to find out where he stands relative to a sales target of actual sales and revenues collected. To do so, the sales manager needs access to both CRM data, which typically has unaggregated sales order data, and to other data, such as aggregated sales data and revenue from a financial management system or logistic system regarding the orders that were fulfilled. A data warehouse environment may be particularly useful, in that several kinds of data (e.g., planned data and actual data) are available, typically in an aggregated format that is useful for reporting. A data warehouse environment also typically includes analytical tools for aggregating and manipulating the data. In general, the alerts in a data warehouse may be conditionally defined by data warehouse users using the query definition tool to define the exception. When identified in an analytical/OLAP process, the exception is used to trigger an alert that is sent out to the data warehouse user. Alerts may be raised in the data warehouse and sent to the portal environment for display in the unified list of alerts so the user knows the activities/tasks that must be addressed. Typically, an alert is sent in an email message to the user, and the email includes a hyperlink that, when selected, will branch to the proper place in the portal to address the activities/tasks related to the alerts. The hyperlinks starts the correct target application (e.g., campaign management within a CRM system) and is parameterized to lead to the correct place within the application (e.g., parameterized with the campaign name to go to the correct campaign using the campaign management function). To do this, the portal typically needs an object type and an object identifier (e.g., an object instance identifier) and, optionally, a method if there are different applications/activities available for the particular object type.

In a portal environment, a user is able to perceive the unified list of alerts from analytical and operational data stores. The user is able to identify a particular alert and jump to a point within the analysis report to see the portion of the analytical report related to the alert.

Figure 4A:
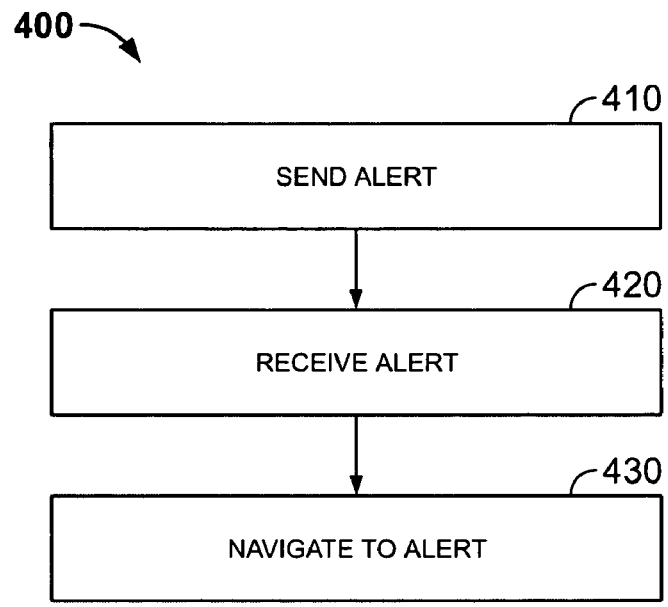

FIG. 4A shows an exemplary procedure 400 for sending an alert to a responsible recipient and enabling the recipient to navigate to an alert source. An alert for whom the recipient has been determined (such as by the execution of process 300) is sent to the identified responsible user (step 410).

In some implementations, an alert may be generated by one of several application systems (that may be running on different computer systems or may be running on the same computer system). For example, generated alert may be related to an operational computer system, such as a customer relationship management (CRM) system, or by a data warehouse analytical application. The alert may include an indication of the application that generated the alert or otherwise may be associated with an indication of the generating application. A user, such as the user of an on-line client 235 of FIG. 2, may receive alerts in a portal through various mechanisms. For example, a CRM server may post alerts to the alert framework, which also offers an alert window, such as iView available from SAP AG of Walldorf (Baden), Germany, in the portal.

In another implementation, data warehouse exceptions are displayed in a different type of alert inbox provided by the data warehouse. CRM alerts typically reflect critical situations with a business process that require immediate reaction by a responsible user. Data warehouse exceptions, however, may not necessarily be critical and instead may merely serve an informational purpose. For example, a data warehouse exception may direct the user to have a closer look at a detailed report. Other data warehouse exceptions may reflect critical situations for which users will want to follow-up immediately. To follow-up, the user may click on a hyperlink that brings the user to the report for closer investigation, or directly to the affected object in the operational application for action by the user. The alerts may be enriched by specific parameters that allow the navigation to the particular report or object that requires the attention of the responsible user.

The alert is received at the system of the responsible user (step 420). Upon receiving the alert, the responsible user may navigate to the alert source (step 430). For example, the responsible user may navigate to the alert within a portal such as portal 121 or portal 216. Navigating from an alert in the portal environment to a report that generated the alert may include permitting the user to jump to the particular portion of the report that relates to the alert without you leaving the portal environment. The navigation occurs within the portal environment and does not jump out of the portal environment to a separate browser session. The enhanced navigation capabilities and information contact provided by the portal environment may be fully leveraged. Separate multiple windows are not opened and the user does not need to manually close and keep track of such separate windows.

Figure 4B:
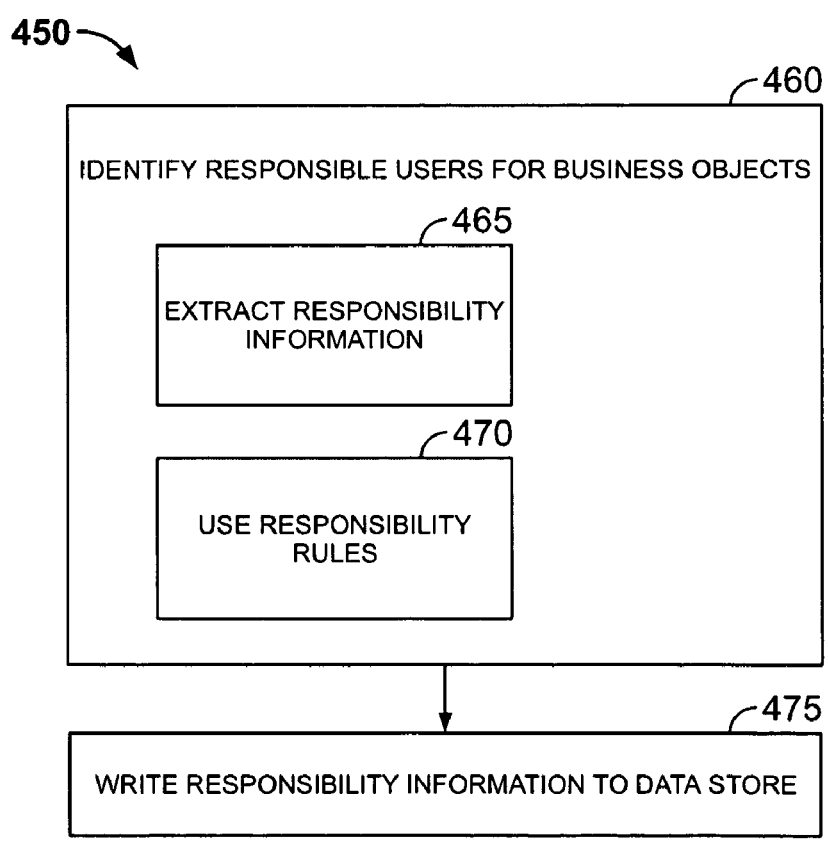

FIG. 4B illustrates an exemplary procedure 450 for generating responsibility information. The procedure 450 may be performed by a processor on a computing system, such as the alert system 210 of FIG. 2. The data analysis processor is directed by a method, script, or other type of computer program that includes executable instructions for performing the procedure 450.

The processor generates responsibility information by determining the responsible users for an object (step 460). The responsibility information may be extracted from the data warehouse data (step 465). Frequently, the information about who is responsible for which object is available explicitly or implicitly in the data warehouse context. For example, the responsible person for an object may be found: (1) in an attribute of the master data for the object; (2) in an attribute the master data for employees (when an employee is a user); (3) in hierarchies associated with objects (such as an organization management hierarchy in which a user is associated with a organization unit in the hierarchy); and (4) in transaction data that may itself identify the responsible user.

In some cases, the responsible person for an object can only be determined through a process of several steps. For example, the responsible person for an account may be the person responsible for the sales organization responsible for the account. In this case, determining the responsible person includes determining the sales organization responsible for the account and then determining the person responsible for that sales organization. Many complex combinations of information stored in master and transactional data might be required in order to determine a responsible person.

Responsibility information also may be determined using responsibility rules (step 470). In some implementations, responsibility rules may be used to describe the manner in which business application data is used to generate responsibility information for alerts. The responsibility rules may be in different forms. In one example of a form of responsibility rules, the received responsibility rules may be a criterion that identifies a particular attribute (in contrast to a value of an attribute) of the data type or types that are to be used to identify data to be distributed. For example, a responsibility rule may identify that the user responsible for a sales order stored in one or more database tables is to be determined based on the region in which the sale originated. In another example, responsibility for an alert related to a particular sales order may be determined based on identifying the employee who is responsible for placing and delivering the sales order. The responsibility rules in such a case may identify a sales order table that identifies the responsible employee for each sales order.

In some implementations, responsibility rules may identify a database query. The results of the database query then may be used to determine the user responsible for an alert.

In yet another example, the responsibility rules may be defined in a computer program (or other type of executable function or instructions) that identifies a collection of processing logic that is used to identify what data sites a subscription is to be assigned. More particularly, the executed computer program identifies business objects for which employees are responsible. A computer program or function for the responsibility rules may include, for example, how one data attribute or value is mapped to another data attribute or value.

It is also possible to provide predetermined business content in the responsible data store as an alternative feature or implementation. This may help to reduce the total cost of ownership (TCO) of an application by reducing the human effort required to manage responsibility information.

In providing alert messages to responsible users from a variety of applications, a responsible object data store may be used to determine a responsible entity for each object type for which an alert may be created. This information may be used to send an alert for the object to the appropriate responsible user.

The results of the responsible user identification step are written to a data store (step 475). For example, the results may be written to a data warehouse, an ODS, or a data mart. The data store may be designated exclusively as a responsibility data store, or may contain data other than responsibility data. The structure of the data store is predefined, for example, by documentation, by providing a template, or by the generation of the data store. The data store for responsibility information may be used to determine the user or users to whom a particular alert should be sent.

Figure 5:
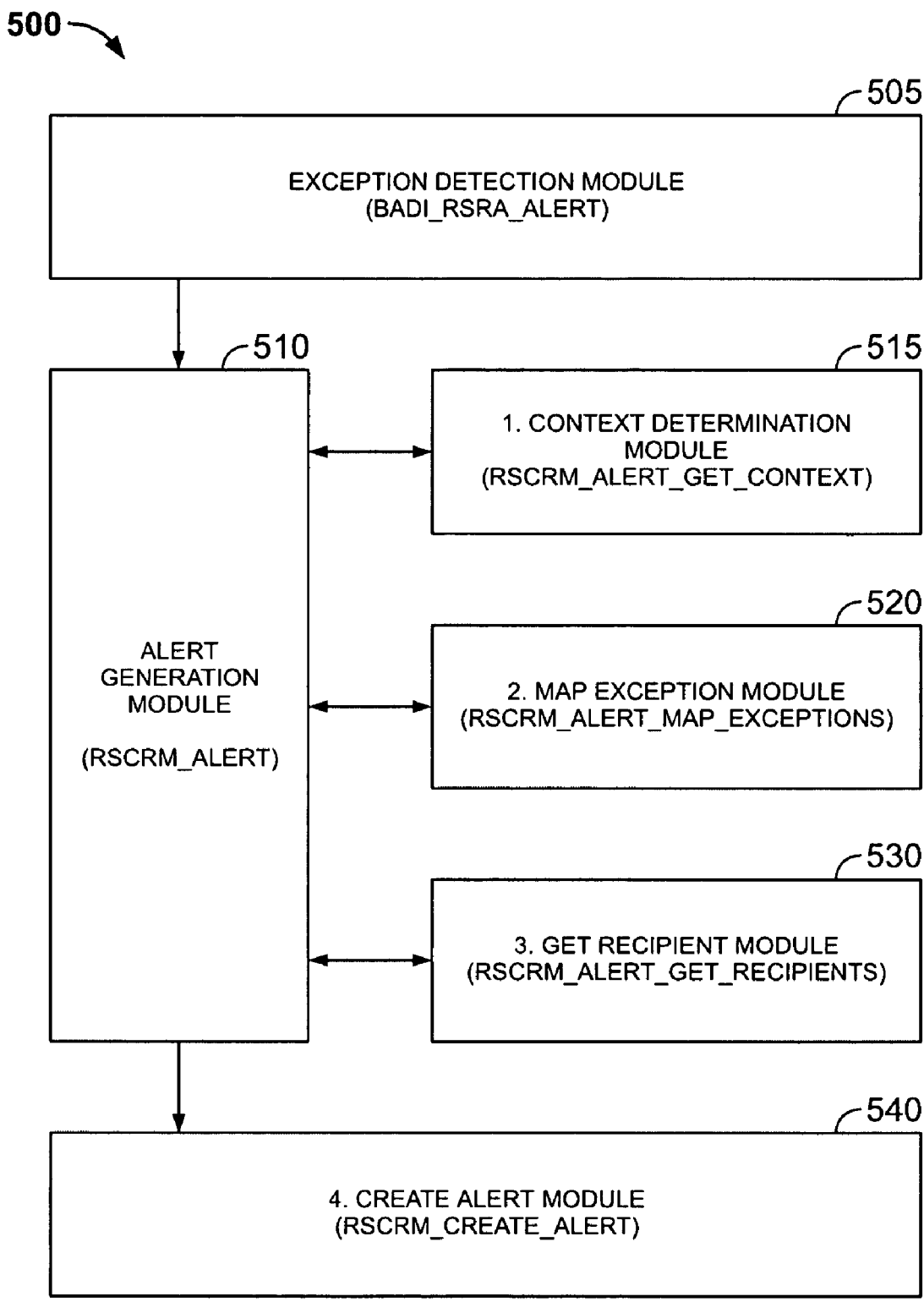
FIG. 5 is a block diagram of the components of a software architecture for an alert process.

FIG. 5 shows an exemplary alert framework 500. In the example of FIG. 5, an exception detection module 505 calls other function modules in order to generate an alert. The exception detection module 505 may call, for example, an alert generation module 510. The alert generation module 510 may call the context determination module 515, the map exception function module 520, the get recipients function module 530, and the create alert function module 540 in order to generate the alert. The context determination module 515 maps inputs to a simplified format and retrieves object types and keys from the exception context. The map exception function module 520 maps data warehouse exceptions to the alerts. The get recipients module 530 determines the list of recipients for the specific alert. Finally, the create alert function module 540 creates the alert to be posted.

The context determination module 515 may return a specific alert to be generated, text for the exception, a list of business objects for which the alert was created, key figure (exception) values, and formatted values.

The map exception function module 520 causes exceptions to be mapped to alert categories on an individual alert level for an exception definition within a query. An exception definition may define multiple threshold ranges, each associated with a particular alert. When running the reports, several exceptions may be raised for the same alert. For example, a query with the revenue per sales organization may contain several organizational units within the same critical value range. The exceptions and alerts may have various relationships. For example, an exception may require no alert, may raise a single alert, and may raise multiple alerts (e.g., inform the manager with a link to the report and the sales representative with a link to the operative transaction). Various exceptions of the same level may have to be grouped into a single alert (e.g., "several of your customers did not order their usual volume this month"), and, in some cases, grouped exceptions may lead to different alerts.

The get recipient function module 530 generates a list of recipients for the alert when the alert is being generated. The recipients are usually the responsible users for a particular business object (e.g., a partner, an opportunity, a region or an organizational unit) contained in the data warehouse query result. The recipient may be a user name that may be found through various look-ups. For example, the recipient may be an attribute in master data for a business object, an attribute in an ODS object, or an attribute of an attribute (of master data or ODS). Even more complex approaches may be used for determining a responsible user for a business object. In one implementation, the responsible user for the alert may be identified by introducing the transactional ODS table with the structure of an object type, an object value, and a responsible user. The transactional ODS can be filled by the customer, for example, through an analysis process so as to permit the customer to decide from where the responsible user can be determined.

Figure 6:
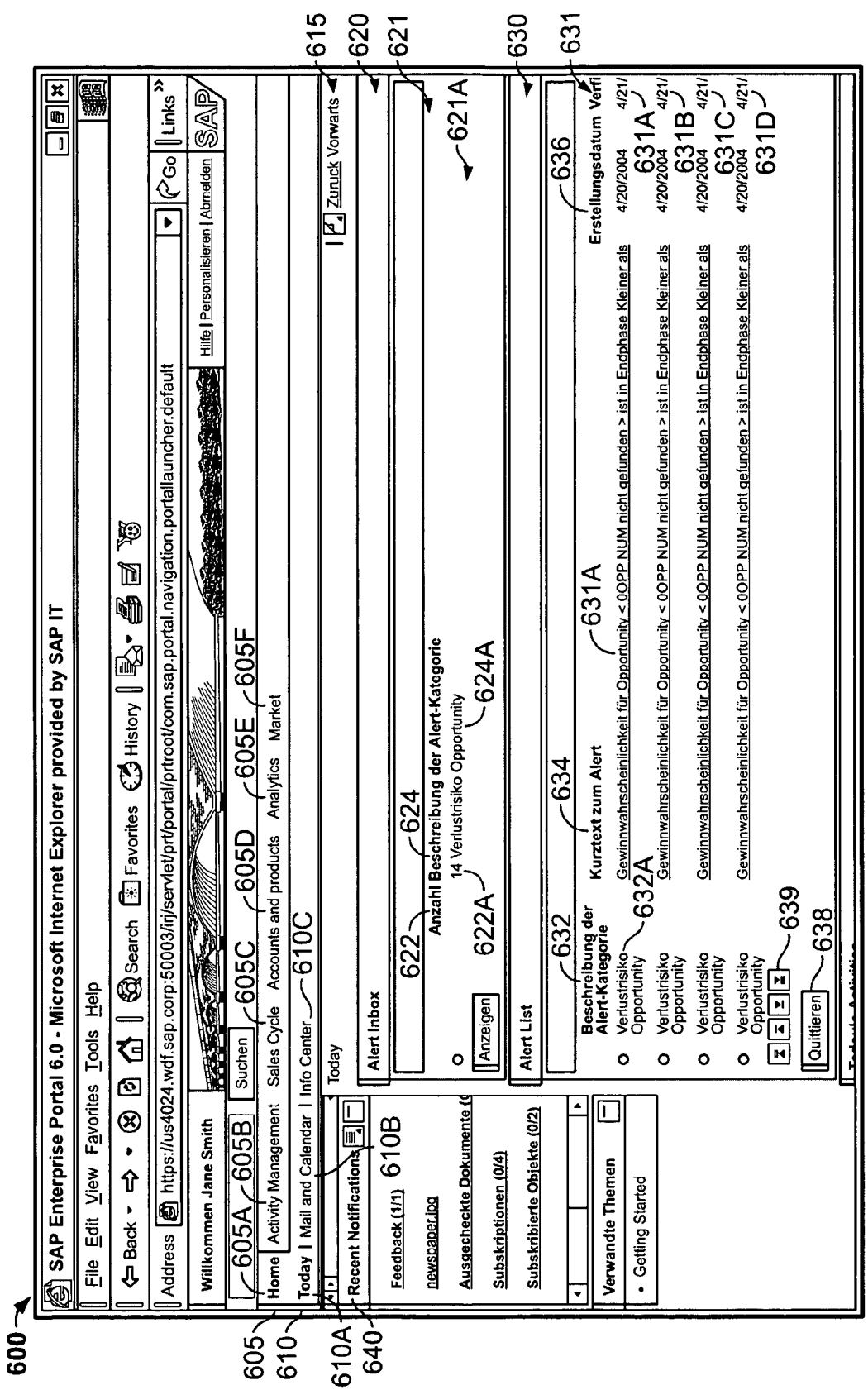
FIGS. 6, 7, and 8 are exemplary user interfaces.

FIG. 6 illustrates one example of a portal user interface (UI) 600 that may be presented to a user. The portal UI may be, for example, an enterprise portal presented to a business user such as a campaign manager, a sales manager, or a marketing manager. The UI 600 includes a first level navigation bar 605, a second level navigation bar 610, a today window 615, and a recent notifications window 640. The first level navigation bar 605 includes a home tab 605A, an activity management tab 605B, a sales cycle tab 605C, an accounts and products tab 605D, an analytics tab 605E, and a market tab 605F. The second level navigation bar 610 includes a today tab 610A, a mail and calendar tab 610B, and an info center tab 610C.

When the user accesses the portal 600, the user may navigate to the today window 615 by, for example, using a mouse or other user input device to manipulate the home tab 605A of the first level navigation bar 605 and the today tab 610A of the second level navigation bar 610. In another implementation, the today window 615 may be the default window presented to the user such that no navigation is required to view the today window. The today window 615, as shown, is used to provide the user with an overview of information that is urgent, such as alert information. The today window 615 includes an alert inbox 620 and an alert list 630. The alert inbox 620 displays a summary of the alerts received by the user. The alert inbox 620 includes a title bar 621 that displays captions for the number of alerts 622 and the alert category 624. As shown, one alert summary 621A has 14 alerts 622A in the risk of loss of opportunity category 624A.

The alert list 630 includes detailed information about the alerts in the alert inbox 620. In particular, the alert list 630 includes a title bar 631 that displays captions for the alert category 632, alert context 634, and date of alert 636. As shown, the alert list 630 displays more information concerning the first four alerts 631A, 631B, 631C, 631D of the 14 alerts 622A appearing in the alert inbox 620. For example, the alert 631A is within the risk of loss of opportunity category 632A, and contains a link 634A1 to the alert context. Using a mouse or other input device, the user may click on or otherwise manipulate the link 634A to navigate within the portal 600 to more detailed information concerning the alert, such as an application or a report. Scroll arrow control 639 is provided to navigate among the other alerts that are not displayed. A control 638 may be presented in order to close an alert by removing it from the alert list 630.

Figure 7:
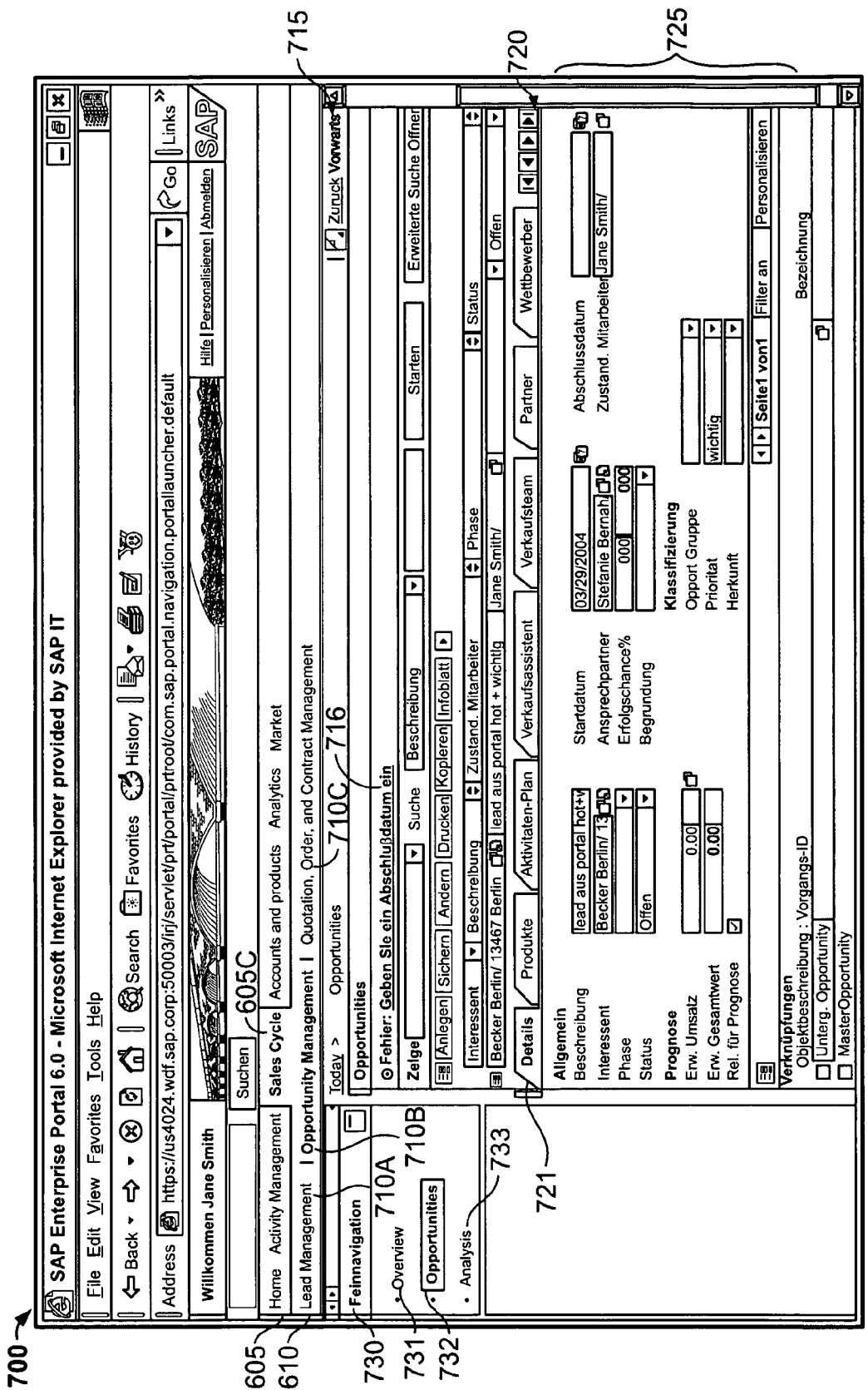

FIG. 7 illustrates one example of a portal UI 700 that may be presented to a user. The portal UI 700 is similar to portal UI 600. In portal UI 700, the user has chosen to click on or otherwise manipulate the link 634A (shown in FIG. 6) to automatically navigate within the portal 600 to more detailed information concerning the alert. As shown in UI 700, an opportunity window 715 provides more detail about the opportunity that was the subject of the alert 631A (shown in FIG. 6). Parameters concerning the specific opportunity that is the subject of alert 631A are passed when the user clicks on the link 634A, and navigation to the specific opportunity window 715 occurs automatically without need for the user to manipulate the first level navigation bar 605 or the second level navigation bar 610. The opportunity window 715 is located under the sales cycle tab 605C of the first level navigation bar 605 and under the opportunity management tab 710B of the second level navigation bar 610.

The opportunity window 715 includes an error message 716 concerning the opportunity and an opportunity navigation bar 720 that enable the user to obtain various information concerning the specific opportunity. For example, a details tab 721 may contain detailed information 725 concerning the specific opportunity that generated the alert. The detailed information 725 may enable the user to determine the cause of the alert and to determine possible solutions or courses of action to address the cause of the alert. The opportunity window 715 also may include a detail navigation window 730 that enables navigation among, for example, an overview 731, opportunities 732, and analysis 733. As shown, navigation automatically occurred to the opportunities 732 portion of the detail navigation window 730 when the user clicked on or otherwise manipulated the link 631A to the alert.

Figure 8:
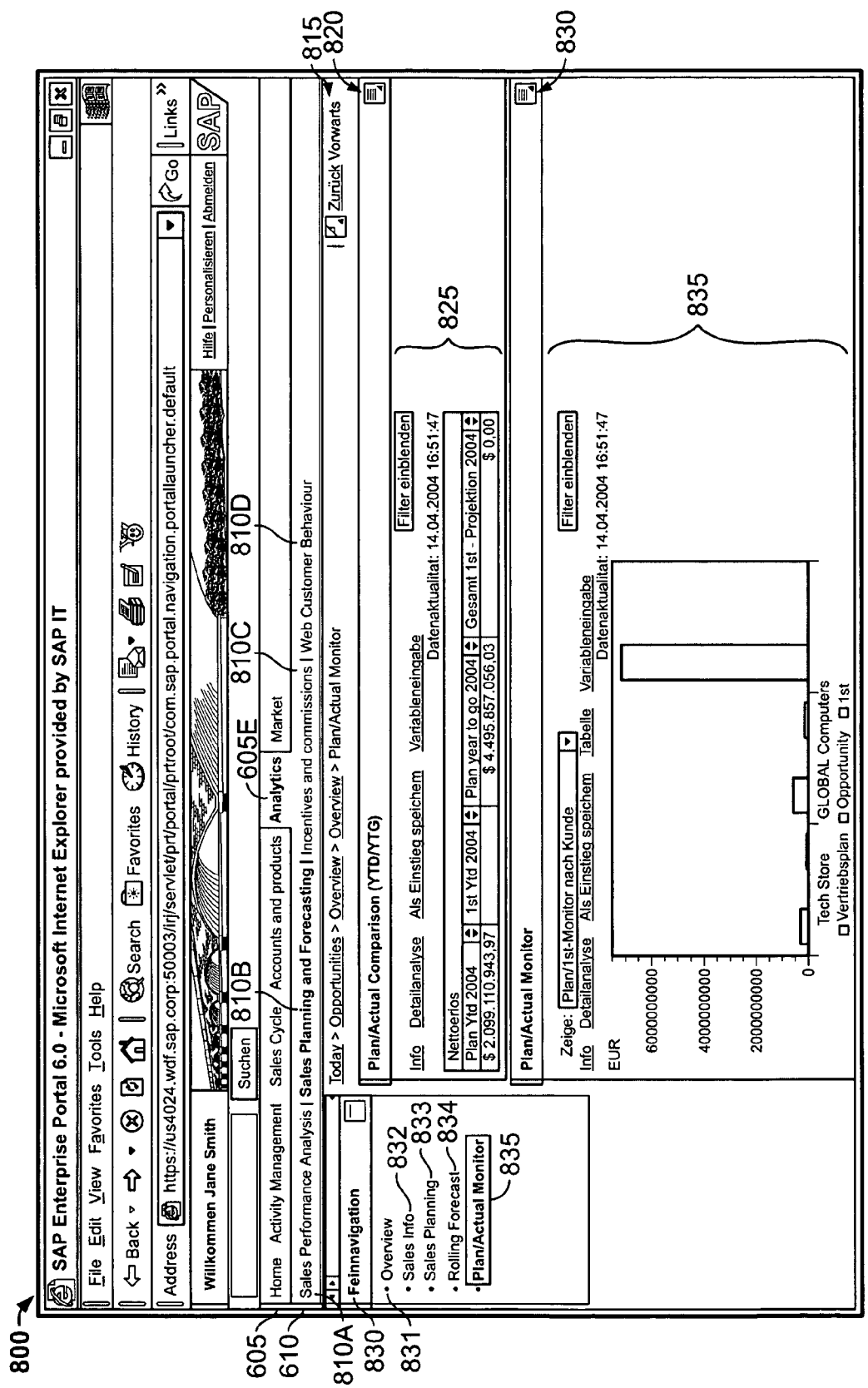

FIG. 8 illustrates an example of a portal UI 800 that may be presented to a user. The UI 800 may be presented to the user instead of, or in addition to, the UI 700. The portal UI 800 is similar to portal UI 600 and portal UI 700. In portal UI 800, the user has chosen to click on or otherwise manipulate the link 634A (shown in FIG. 6) to automatically navigate within the portal 600 to more detailed information concerning the alert. As shown in UI 800, a report window 815 (plan/actual monitor) provides more detail about the opportunity that was the subject of the alert 631A (shown in FIG. 6). Parameters concerning the specific opportunity that is the subject of alert 631A are passed when the user clicks on the link 634A, and navigation to the report window 815 occurs automatically without need for the user to manipulate the first level navigation bar 605 or the second level navigation bar 610. The report window 815 is located under the analytics tab 605E of the first level navigation bar 605 and under the sales planning and forecasting tab 810B of the second level navigation bar 610.

The report window 815 includes detailed information concerning the report that generated the alert 631A. As shown, the report window 815 includes a plan/actual comparison window 820 that contains specific data window 825 and a plan actual monitor window 830 that includes detailed report information 835 that was used to generate the alert. The user is able to use various techniques such as OLAP processing and data filtering to better understand the reasons for the problem. The information in the report window 815 may enable the user to determine the cause of the alert and to determine possible solutions or courses of action to address the cause of the alert. The opportunity window 815 also may include a detail navigation window 830 that enables navigation among, for example, an overview 831, sales information 832, sales planning 833, rolling forecast 834, and a plan/actual monitor 835. As shown, navigation automatically occurred to the plan/actual monitor 835 portion of the detail navigation window 830 when the user clicked on or otherwise manipulated the link 631A to the alert.

The techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in various forms of programming languages, including compiled or interpreted languages, and it can be deployed in various forms, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and various of one or more processors of various kinds of digital computer. Generally, a processor will receive instructions and data from a read-only memory or a random access memory or both. A computer includes a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Although the techniques and concepts are described using certain sub-processes, the techniques and concepts may be applicable to other types of sub-processes. A number of implementations of the techniques have been described. Nevertheless, it will be understood that various modifications may be made. Accordingly, other implementations are within the scope of the following claims.

What is claimed is:

1. A computer-implemented method of providing portal navigation for alerts, the method comprising:
generating, on a display device and using a portal program, a portal environment configured to present content from transaction portal applications associated with a transaction data store having transaction information defined as objects of multiple object types, each of the transaction portal applications belonging to a respective one of the object types, the portal environment having a navigation function configured to identify navigation targets for each of the objects by the object type, a method of the object type, and an object ID of the object;
initiating an analytical application associated with an analytical data store having analytical information based at least in part on the transaction data store, the analytical application configured to generate a report based on at least part of the analytical information;
displaying alerts in an alerts area in the portal environment, wherein a first alert comprises a transaction alert that is associated with one of the objects in the transaction information, and a second alert comprises an analytical alert generated based on the report;
receiving, from a user, an input indicating a selection of at least one of the first and second alerts;
navigating, when the first alert is selected in the input, to one of the transaction portal applications by forwarding to the navigation function, for one of the objects implicated by the first alert: an object type, a method, and an object ID; and
navigating, when the second alert is selected in the input, to the analytical application by forwarding to the navigation function at least a name of the report and an object ID of one of the objects for which the report should be started, wherein the navigation to the analytical application comprises an integration of the analytical alert into the portal environment.

2. The method of claim 1, wherein the integration is facilitated by treating the report as a new object type in the portal environment.

3. The method of claim 2, wherein the name of the report is forwarded to the navigation function as a method of the new object type.

4. The method of claim 1, wherein the integration is facilitated by treating the report as a special method for a first object type of the multiple object types.

5. The method of claim 4, wherein the name of the report is forwarded to the navigation function as a method of the first object type.

6. The method of claim 5, further comprising:
determining the first object type, before the second alert is generated, by accessing an attribute for an entity or field known to the analytical data store; and
generating the second alert based on the report, wherein the second alert identifies the first object type.

7. The method of claim 1, wherein at least one of the first and second alerts describes a critical state within a business process that generally requires the immediate attention or reaction of a responsible user.

8. The method of claim 1, wherein at least one of the first and second alerts corresponds to an exception identified during a data analysis process in which an actual state deviates from a desired state.

9. The method of claim 1, further comprising providing at least one of the first and second alerts with a priority level and parameters that identify the object type and the particular object to which the alert relates.

10. The method of claim 1, further comprising grouping at least one of the first and second alerts into a category of alerts and the alert with a unique alert identifier.

11. The method of claim 1, wherein the portal environment enables the user to set criteria for at least one of the first and second alerts.

12. A machine-readable storage device storing a computer program product for performing a navigation process, the computer program product including instructions that, when executed, cause at least one processor to:
generating, on a display device and using a portal program, a portal environment configured to present content from transaction portal applications associated with a transaction data store having transaction information defined as objects of multiple object types, each of the transaction portal applications belonging to a respective one of the object types, the portal environment having a navigation function configured to identify navigation targets for each of the objects by the object type, a method of the object type, and an object ID of the object;
initiating an analytical application associated with an analytical data store having analytical information based on the transaction data store, the analytical application configured to generate a report based on at least part of the analytical information;
displaying alerts in an alerts area in the portal environment, wherein a first alert comprises a transaction alert that is associated with one of the objects in the transaction information, and a second alert comprises an analytical alert generated based on the report;
receiving, from a user, an input indicating a selection of at least one of the first and second alerts;
navigating, when the first alert is selected in the input, to one of the transaction portal applications by forwarding to the navigation function, for one of the objects implicated by the first alert: an object type, a method, and an object ID; and
navigating, when the second alert is selected in the input, to the analytical application by forwarding to the navigation function at least a name of the report and an object ID of one of the objects for which the report should be started, wherein the navigation to the analytical application comprises an integration of the analytical alert into the portal environment.

13. A system comprising a processor connected to a storage device and one or more input/output devices, the processor configured to:
generating, on a display device and using a portal program, a portal environment configured to present content from transaction portal applications associated with a transaction data store having transaction information defined as objects of multiple object types, each of the transaction portal applications belonging to a respective one of the object types, the portal environment having a navigation function configured to identify navigation targets for each of the objects by the object type, a method of the object type, and an object ID of the object;
initiating an analytical application associated with an analytical data store having analytical information based on the transaction data store, the analytical application configured to generate a report based on at least part of the analytical information;
displaying alerts in an alerts area in the portal environment, wherein a first alert comprises a transaction alert that is associated with one of the objects in the transaction information, and a second alert comprises an analytical alert generated based on the report;
receiving, from a user, an input indicating a selection of at least one of the first and second alerts;
navigating, when the first alert is selected in the input, to one of the transaction portal applications by forwarding to the navigation function, for one of the objects implicated by the first alert: an object type, a method, and an object ID; and
navigating, when the second alert is selected in the input, to the analytical application by forwarding to the navigation function at least a name of the report and an object ID of one of the objects for which the report should be started, wherein the navigation to the analytical application comprises an integration of the analytical alert into the portal environment.

* * * * *